United States Patent
Haartsen

Patent Number: 5,909,433
Date of Patent: Jun. 1, 1999

[54] METHOD AND APPARATUS FOR ACQUIRING LOW DUTY-CYCLE REFERENCE SIGNALS IN A MOBILE COMMUNICATIONS ENVIRONMENT

[75] Inventor: Jacobus Cornelis Haartsen, Staffanftorp, Sweden

[73] Assignee: Telefonaktiebolaget L M Ericsson (publ), Sweden

[21] Appl. No.: 08/705,661

[22] Filed: Aug. 30, 1996

[51] Int. Cl.⁶ .............. H04B 7/212; H04B 7/26; H04Q 7/20

[52] U.S. Cl. .............. 370/337; 370/350; 375/362; 455/434

[58] Field of Search ................... 370/347, 350, 370/337, 321, 324, 503, 516, 518; 375/354, 362, 371, 373, 376; 455/422, 434, 450, 451, 452, 507, 509, 517, 575, 67.1

[56] References Cited

U.S. PATENT DOCUMENTS

| | | | |
|---|---|---|---|
| 5,109,528 | 4/1992 | Uddenfeldt | 455/442 |
| 5,241,688 | 8/1993 | Arora | 455/502 |
| 5,283,806 | 2/1994 | Dartois et al. | 375/200 |
| 5,327,429 | 7/1994 | Dartois et al. | 370/350 |
| 5,343,497 | 8/1994 | Canosi et al. | 375/362 |
| 5,383,225 | 1/1995 | Aguirre et al. | 375/354 |
| 5,428,668 | 6/1995 | Dent et al. | 455/452 |
| 5,450,612 | 9/1995 | Chanroo et al. | 455/38.1 |
| 5,502,749 | 3/1996 | Ozaki | 375/368 |
| 5,506,863 | 4/1996 | Meidan et al. | 375/202 |
| 5,535,259 | 7/1996 | Dent et al. | 455/452 |
| 5,657,356 | 8/1997 | Ozaki | 375/346 |

FOREIGN PATENT DOCUMENTS

| | | |
|---|---|---|
| 0 430 605 A3 | 11/1990 | European Pat. Off. . |
| 0 557 873 A3 | 2/1993 | European Pat. Off. . |
| 0430605 | 11/1990 | WIPO . |
| 0445887 | 3/1991 | WIPO . |
| 0557873 | 2/1993 | WIPO . |

*Primary Examiner*—Alpus H. Hsu
*Attorney, Agent, or Firm*—Jenkens & Gilchrist, P.C.

[57] ABSTRACT

A method is provided whereby a mobile cellular terminal can acquire and lock onto a low duty-cycle reference beacon transmitted from a private radio system base station. The terminal alternately scans the private radio beacon frequency spectrum (over a large frequency range) and processes the received signals off-line until the reference beacon is found. During each scan, only a limited amount of sampling time is allowed, in order to keep the amount of sampled data manageable. The processing time is selected so as to be long enough for the terminal to complete any required (software) analysis of the sampled data. Consequently, even if the terminal misses a reference beacon that arrives during the processing period, the next consecutive reference beacon will be found.

25 Claims, 3 Drawing Sheets

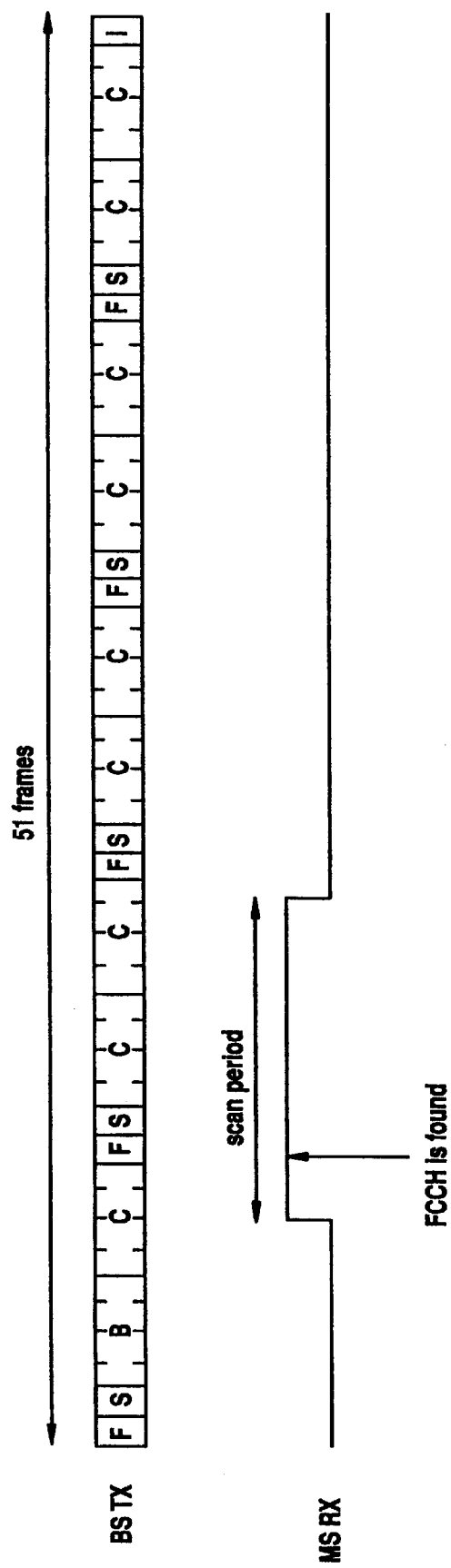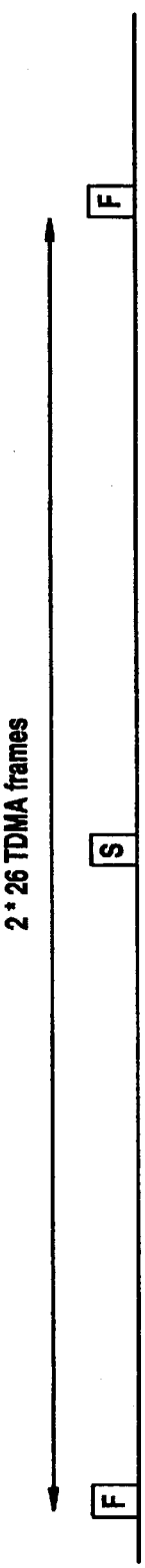

METHOD AND APPARATUS FOR ACQUIRING LOW DUTY-CYCLE REFERENCE SIGNALS IN A MOBILE COMMUNICATIONS ENVIRONMENT

BACKGROUND OF THE INVENTION

1. Technical Field of the Invention

The present invention relates generally to the wireless telecommunications field and, in particular, to a method and apparatus for a mobile communications terminal to acquire and synchronize with a low duty-cycle beacon signal.

2. Description of Related Art

Mobile radio system base stations, such as the base stations used in wide area cellular phone systems or for indoor cordless phones, transmit a fixed frequency control signal on a beacon or control channel. A beacon channel serves the following purposes: (1) it provides a time, frequency, and signal power reference for mobile terminals; (2) it provides network broadcast information; and (3) it is used to facilitate access control. The beacon channel's reference function is particularly important for locking a mobile terminal to a fixed base station channel for communications therebetween.

Typically, when a mobile terminal is first turned on, it powers up with no prior knowledge about the frequency or timing of any radio base station. Consequently, the mobile terminal is required to search both in frequency and time for a proper reference signal pattern which the terminal can then lock onto. In prior analog communications systems, these time and frequency uncertainties at power up were separated by transmitting a continuous wave (CW) carrier from the base station. The mobile terminals were able to derive a frequency reference from the CW signal. Currently, in the more advanced digital radio systems, such as the Global System for Mobile communications (GSM) in Europe, the Personal Digital Communications (PDC) System in Japan, the Digital Advanced Mobile Phone System (D-AMPS) in North America, the Digital European Cordless Telephone (DECT) System, and the new Personal Communications System (PCS), the timing and frequency reference signals are combined in a single reference burst, which is broadcast periodically on a single carrier frequency. The mobile terminal has to find this burst, in both time and frequency, in order to synchronize (lock) with it.

Generally, two techniques are used in existing digital systems to acquire a reference burst and synchronize with it. With the first technique, a mobile terminal uses a plurality of on-line correlators to continuously search the received signal for a fixed reference pattern. Each correlator is used to search at a different frequency offset. With the second technique, a mobile terminal samples a reasonable portion of the received signal, and then processes the sample data off-line in order to search for the fixed reference pattern at the different frequency offsets.

The first of the above-described acquisition techniques is technically straightforward, but it requires a considerable amount of hardware to implement in case a large frequency uncertainty exists, because each correlator being used can cover only a limited frequency uncertainty range. Additionally, the first technique is relatively inflexible, because it requires major hardware changes in the terminals whenever a new base station reference signal is used.

The second acquisition technique is much more flexible than the first technique, primarily because the second technique can be implemented in software. Consequently, once the terminal has sampled a received signal, a digital processor in the terminal can store the samples in memory and test them during a relatively large time and frequency window. However, the second technique is still limited in the sense that by lowering the duty cycle of the reference signal, the signal sampling time is lengthened. Lengthening the sampling time places greater storage and processing requirements on the terminal hardware. Namely, for a reasonably fast signal acquisition time, the sampled data should contain at least one complete reference burst. In order to ensure that a complete reference burst is sampled, the duration of the sampled signal should be longer than the period between two successive reference bursts, plus the period of the reference burst itself.

U.S. Pat. Nos. 5,428,668 and 5,535,259 describe a recently developed private radio system that has been adapted for use with cellular mobile phones. The reference signal transmitted from the private radio system's base station has a very low duty-cycle and can have a very large frequency uncertainty. Consequently, a substantial amount of data can be sampled during the relatively long period between successive reference bursts. In that regard, existing terminal memory and processing constraints make the existing time and frequency synchronization techniques implausible.

SUMMARY OF THE INVENTION

It is an object of the present invention to enable a mobile terminal to acquire a low duty-cycle reference signal with limited memory capacity.

It is also an object of the present invention to enable a mobile terminal to acquire a low duty-cycle reference signal off-line and over a large frequency range.

In accordance with one aspect of the present invention, the foregoing and other objects of the present invention are achieved by a method and apparatus for a mobile terminal to acquire a low duty-cycle reference signal, in both frequency and time, with an off-line operation that alternately samples and processes signal data over a large frequency range, but the number of samples is still small enough to be stored in the terminal's memory.

In accordance with another aspect of the present invention, the foregoing and other objects of the present invention are achieved by a method and apparatus for a mobile terminal to acquire a low duty-cycle reference signal, in both frequency and time, with an off-line operation that alternately samples and processes signal data over a large frequency range, wherein the sampling and processing periods are selected so that no more than one reference burst would be missed during these off-line periods.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is a diagram that illustrates a typical high duty-cycle FCCH and SCH acquisition sequence used in a GSM mobile terminal;

FIG. 4 is a diagram that can be used to illustrate a method of acquiring a low duty-cycle beacon signal at a mobile terminal, in accordance with a preferred embodiment of the present invention;

DETAILED DESCRIPTION OF THE DRAWINGS

The preferred embodiment of the present invention and its advantages are best understood by referring to FIGS. 1–6 of the drawings, like numerals being used for like and corresponding parts of the various drawings.

Figure 1:
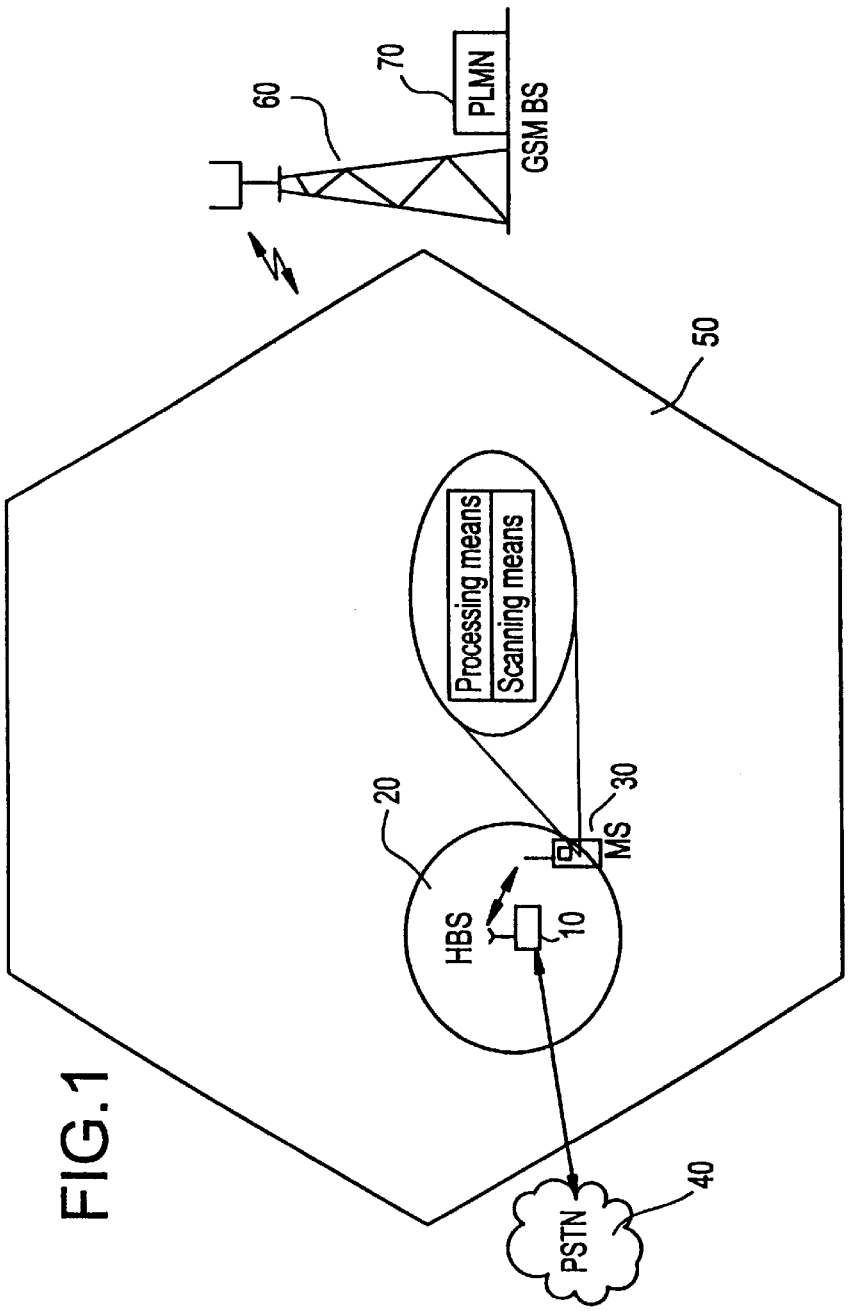
FIG. 1 is a top level schematic block diagram that illustrates an example of a private radio home base station operating in a mobile communications network coverage area.

FIG. 1 is a top level schematic block diagram that illustrates an example of a private radio "home base station" (HBS) operating in a mobile communications network coverage area. A private radio system HBS 10 is shown, which defines a relatively small coverage area 20. A cellular mobile terminal 30, which is located within coverage area 20, is linked via an air interface to HBS 10. Mobile terminal 30 is operating with HBS 10 in a cordless mode. If located outside of HBS coverage area 20, but inside coverage area 50, mobile terminal 30 would be operating with base station 60 in a cellular mode. HBS 10 is connected via a wireline to a PSTN 40. Mobile terminal 30 and HBS 10 are located within a relatively large cellular coverage area 50, which is defined by base station 60. Base station 60 includes a transmitter/receiver section, and is a component part of a public land mobile network (PLMN) 70. In this illustrative example, PLMN 70 may be assumed to be the GSM. A detailed description of the structure and operation of a private radio HBS and a cellular mobile phone operating in a cordless mode is provided in U.S. Pat. Nos. 5,428,668 and 5,535,259.

Generally, the reference signal broadcast from a radio base station forms the backbone of the mobile network. The reference signal provides mobile terminals with a time and frequency reference to synchronize with or lock on to, and ultimately, a means for the terminals to access the network. Digital cellular communications systems, such as, for example, the GSM, PDC, D-AMPS, DECT and PCS, which are time-division multiple access (TDMA) systems, broadcast a reference signal periodically as a burst of fixed information. This reference burst is transmitted on a single carrier frequency, and forms a reference beacon for the terminals to lock on to. Hereinafter, the GSM is used as an illustrative example in order to help describe the present invention, but it should be understood that the invention is not intended to be limited to just the GSM. Any radio system that utilizes a pulsed beacon transmission for synchronization can come within the scope of the present invention.

Figure 2:
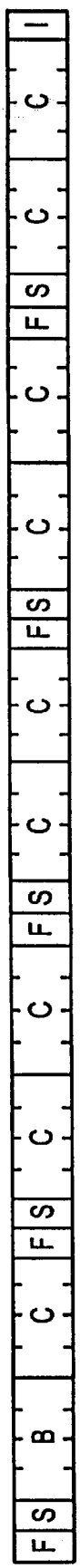
FIG. 2 is a diagram that illustrates a multiframe sequence transmitted in a GSM broadcast channel.

In the GSM, the base station's (e.g., base station 60) frequency correction channel (FCCH) broadcasts beacons that are used to provide fine frequency synchronization and coarse time synchronization for the mobile terminals (e.g., mobile terminal 30). The base station's synchronization channel (SCH) broadcasts beacons that are used to provide fine time synchronization for the terminals. FIG. 2 is a diagram that illustrates a multiframe sequence transmitted in the GSM broadcast channel (BCH). As shown, the FCCH and SCH bursts occur every 10 TDMA frames, separated by four broadcast control channel (BCCH) frames and four common control channel (CCCH) frames. An idle frame is transmitted once at the end of every multiframe sequence.

When the mobile terminal (30) powers up, it (using an internal processor) initially searches for an FCCH burst. Once the terminal finds an FCCH burst, it can do a coarse time and frequency synchronization. After that, the SCH burst can be found quickly and used by the terminal for fine time and frequency synchronization.

Any of a number of known techniques may be used to find the FCCH burst. For example, the GSM uses a Gaussian Minimum Shift Keying (GMSK) modulating method. Consequently, since an FCCH burst contains only zeroes, it results in a constant phase ramp which can be readily detected in the GMSK modulated signal received at the mobile terminal. The mobile terminal utilizes the detected FCCH as a coarse time and frequency reference. Based on the frame position of the FCCH, the mobile terminal can determine where the SCH is located in the received signal (e.g., the subsequent TDMA frame position). FIG. 3 is a diagram that illustrates a typical high duty-cycle FCCH and SCH acquisition sequence used in a GSM mobile terminal. Notably, in the GSM, the distance between two consecutive FCCH beacons is 10 TDMA frames, except between the last FCCH burst in one multiframe and the first FCCH burst in the next multiframe, in which case the distance is 11 TDMA frames (due to the existence of an extra idle frame).

The reference sources in the cellular system are relatively accurate (e.g., the reference accuracy is better than 0.05 ppm in the GSM base stations), which results in a maximum relative offset between the base station and mobile terminal of about ±25 ppm (taking into account the entire temperature range) due to the inaccurate crystals used in the mobile terminal. However, for cost-effectiveness, the accuracy of the crystals used in the private base stations is much less than that of the crystals used in the cellular base stations. Typically, the accuracy of the crystals used in the private base stations is similar to that found in the mobile terminals. This results in a maximum relative offset between a private base station and a mobile terminal of +50 ppm (worst case). Therefore, the frequency uncertainty between a mobile terminal and a private base station is twice as large as the frequency uncertainty between the mobile terminal and a cellular base station.

FIG. 4 is a diagram that can be used to illustrate a method of acquiring a low duty-cycle beacon signal at a mobile terminal, in accordance with a preferred embodiment of the present invention. The diagram in FIG. 4 represents the beacon channel transmitted by an exemplary private radio system base station that is compatible with the GSM. A detailed description of such a low duty-cycle beacon channel is provided in commonly-assigned, copending U.S. patent application Ser. No. 08/704,901. Since the time period between two consecutive FCCH beacons is relatively long (e.g., 52 TDMA frames versus 10 in the GSM), the conventional off-line acquisition techniques are not viable, because a large amount of data has to be sampled by the mobile terminal for such a long period of time, and the terminal has to analyze that large amount of data off-line.

Figures 5, 6:
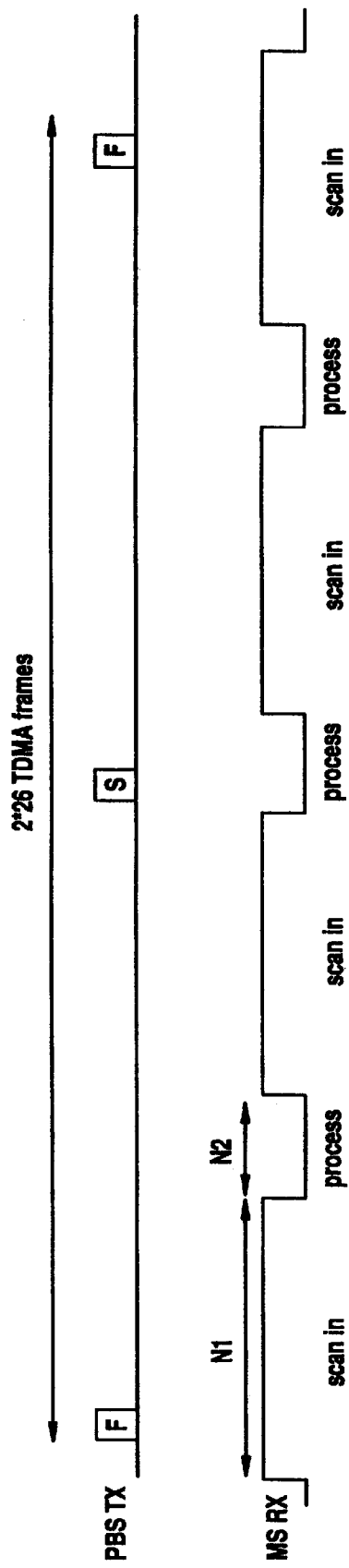
FIG. 5 is a diagram that illustrates how a low duty-cycle reference beacon transmitted by a private radio system base station can be acquired by a cellular mobile terminal, in accordance with a preferred embodiment of the present invention.
FIG. 6 is a table that illustrates examples of values for parameters K, N1 and N2, described with respect to FIG. 5.

FIG. 5 is a diagram that illustrates how a low duty-cycle reference beacon transmitted by a private radio system base station can be acquired by a cellular mobile terminal, in accordance with a preferred embodiment of the present invention. In this embodiment, the private system's beacon channel is compatible with the GSM air interface protocol. Essentially, during the reference beacon acquisition period, and under the control of appropriate software, the mobile terminal (e.g., terminal 30) alternately scans the private radio beacon frequency spectrum and processes the received signals until the reference beacon is found. During each scan, only a limited amount of sampling time is allowed, in order to keep the amount of sampled data manageable (e.g., within the memory space requirements). The processing time is selected to be long enough for the terminal to complete any required (software) analysis of the sampled data.

During the processing period, no new data can be sampled and received, since the old data must be processed before enough memory area is again available to receive the new data. Consequently, a transmitted reference burst may be missed during the processing period. However, the scanning time and processing time are selected so that, if a reference burst is missed during a processing period, the next consecutive reference burst will be found. Consequently, at power up, the terminal can acquire and synchronize with at least the second consecutive beacon reference transmitted by the private base station. Preferably, the terminal's processing time is made short as possible to minimize the probability of missing a transmitted beacon.

Specifically, referring to the illustrative example shown in FIG. 5, a private base station (e.g., base station 10) transmits a beacon with a separation of 2*26 TDMA frames between FCCH/SCH pairs. The mobile terminal (e.g., terminal 30) samples the beacon channel frequencies for a first predetermined time, N1. The terminal then processes and analyzes the sampled data for a second predetermined time, N2. If the time (separation) between two consecutive beacons is P TDMA frames, and a beacon (FCCH or SCH) can be at any slot position in a TDMA frame, the following conditions (A, B) should be fulfilled simultaneously in order for the terminal to avoid missing successive beacons:

$A: K*N1+(K-1)*N2 \geq P+1$ $B: K*N2+(K-1)*N1 \leq P-1$ where the parameters K, N1, N2, and P are integers, and K is the number of scan/process periods within one beacon interval. For example, for the beacon structure described in commonly-assigned, copending U.S. patent application Ser. No. 08/704,901, P is equal to 52.

FIG. 6 is a table that illustrates examples of values selected for K, N1 and N2, described above with respect to FIG. 5, whereby conditions A and B can be simultaneously fulfilled. For example, in the second row from the top in the table, the value shown for the parameter N1 (11) represents a scanning length that is close to what can be used in the GSM. So, for a GSM mobile terminal to acquire a beacon transmitted by a private radio base station (as shown, for example, in FIG. 5), the terminal can scan and sample the beacon frequencies for 11 consecutive TDMA frames (N1), and process the sampled data during 4 consecutive TDMA frames (N2). If a beacon arrives at the terminal during the processing period and is missed, by meeting the above-described conditions (A, B), the terminal will find the next consecutive beacon to arrive.

Although a preferred embodiment of the method of the present invention has been illustrated in the accompanying Drawings and described in the foregoing Detailed Description, it will be understood that the invention is not limited to the embodiment(s) disclosed, but is capable of numerous rearrangements, modifications and substitutions without departing from the spirit of the invention as set forth and defined by the following claims.

What is claimed is:

1. A method whereby a communications terminal can acquire a low duty-cycle reference signal over a large frequency range, comprising the steps of:

receiving a plurality of reference signal frequencies;

sampling said plurality of reference signal frequencies for a first predetermined period of time, said first predetermined period of time associated with a size of a memory device in said communications terminal;

processing, off-line, said sampling of said plurality of reference signal frequencies for a second predetermined period of time, said second predetermined period of time associated with an analysis time; and selecting the first and second predetermined periods of time to avoid missing successive reference beacons within the received reference signal frequencies used to acquire the low duty-cycle reference signal.

2. The method according to claim 1, wherein said first predetermined period of time is equal to 11 TDMA frames.

3. The method according to claim 2, wherein said second predetermined period of time is equal to 4 TDMA frames.

4. The method according to claim 1, wherein said mobile communications terminal comprises a GSM mobile terminal.

5. The method according to claim 1, wherein said low duty-cycle reference signal and said reference beacons are transmitted from a private radio system base station.

6. The method according to claim 1, wherein said low duty-cycle reference signal comprises a frequency correction channel.

7. The method according to claim 1, wherein said low duty-cycle reference signal comprises a synchronization channel.

8. The method according to claim 6, wherein said frequency correction channel is transmitted from said private radio system base station.

9. The method according to claim 7, wherein said synchronization channel is transmitted from said private radio system base station.

10. A method for use by a mobile communications terminal to acquire a low duty-cycle reference signal having a period, P, comprising the steps of:

scanning a band of reference signal frequencies for a first predetermined period of time, N1;

processing for a second predetermined period of time, N2, information obtained during said first predetermined period of time; and repeating each of said scanning and processing steps K times during said period P, whereby two conditions are fulfilled simultaneously:

$K*N1+(K-1)*N2 \geq P+1$; and $K*N2+(K-1)*N1 \leq P-1$.

11. The method according to claim 10 wherein said first predetermined period of time is equal to 11 TDMA frames.

12. The method according to claim 10, wherein said second predetermined period of time is equal to 4 TDMA frames.

13. The method according to claim 10, wherein said mobile communications terminal comprises a GSM mobile terminal.

14. The method according to claim 10, wherein said mobile communications terminal comprises a PDC mobile terminal.

15. The method according to claim 10, wherein said mobile communications terminal comprises a D-AMPS mobile terminal.

16. The method according to claim 10, wherein said mobile communications terminal comprises a PCS mobile terminal.

17. The method according to claim 10, wherein said mobile communications terminal comprises a DECT mobile terminal.

18. The method according to claim 10, wherein said low duty-cycle reference signal comprises a beacon reference signal transmitted from a private radio system base station.

19. The method according to claim 10 wherein said low duty-cycle reference signal comprises a frequency correction channel.

20. The method according to claim 10, wherein said low duty-cycle reference signal comprises a synchronization channel.

21. The method according to claim 19, wherein said low duty-cycle reference signal comprises a frequency correction channel transmitted from said private radio system base station.

22. The method according to claim 20, wherein said low duty-cycle reference signal comprises a synchronization channel transmitted from said private radio system base station.

23. The method according to claim 10 wherein said period, P, is equal to 52 TDMA frames.

24. The method according to claim 23, wherein K is equal to 4.

25. A GSM mobile communications terminal for use in acquiring a low duty-cycle reference signal having a period, P, said low duty-cycle reference signal is transmitted from a private radio system base station, said GSM mobile communications terminal comprising:

scanning means for scanning a band of reference signal frequencies for a first predetermined period of time, N1; and processing means for processing for a second predetermined period of time, N2, information obtained during said first predetermined period of time, said scanning means and said processing means are actuated K times during said period P so that two conditions are fulfilled simultaneously:

$K*N1+(K-1)*N2 \geq P+1$; and $K*N2+(K-1)*N1 \leq P-1$.

* * * * *